United States Patent [19]

Locke

[11] 4,335,603
[45] Jun. 22, 1982

[54] SONIC MEASUREMENT OF WEB TENSION

[75] Inventor: Stephen A. Locke, Rockford, Ill.

[73] Assignee: Beloit Corporation, Beloit, Wis.

[21] Appl. No.: 177,722

[22] Filed: Aug. 13, 1980

[51] Int. Cl.$^3$ .............................................. G01N 29/00
[52] U.S. Cl. ....................................... 73/159; 73/581
[58] Field of Search ........................ 73/159, 597, 581

[56] References Cited

U.S. PATENT DOCUMENTS

| 2,661,714 | 12/1953 | Greenwood, Jr. et al. | 73/629 |
| 4,073,007 | 2/1978 | Boivin | 73/597 |
| 4,109,520 | 8/1978 | Eriksson | 73/581 |

FOREIGN PATENT DOCUMENTS

| 601609 | 4/1978 | U.S.S.R. | 73/597 |
| 682776 | 10/1979 | U.S.S.R. | 73/581 |

Primary Examiner—Stephen A. Kreitman
Attorney, Agent, or Firm—Hill, Van Santen, Steadman, Chiara & Simpson

[57] ABSTRACT

Tension in a moving web is measured by subjecting the web to an ultrasonic pulse train and measuring the time interval for the resultant transverse waves in the web to proceed a known distance past a point upstream (or downstream). The composite web plus wave velocity is calculated and the web travel time is added (or subtracted) to obtain wave velocity which is related to tension in accordance with the equation $T = a^2 w / g_c$, where $T$ = web tension, $a$ = wave velocity, $w$ = mass per unit area and $g_c$ = lb mass ft/lb force sec$^2$ conversion factor.

10 Claims, 7 Drawing Figures

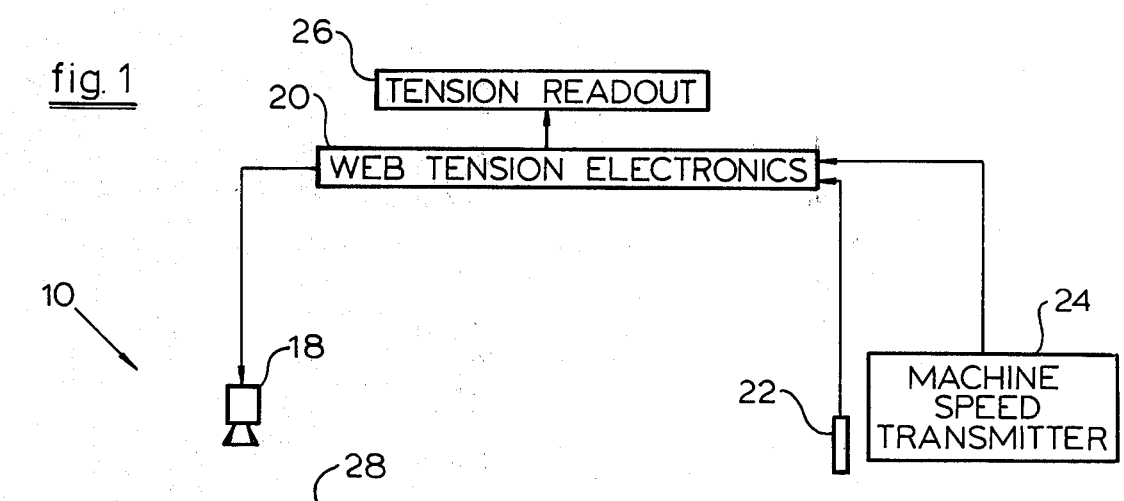
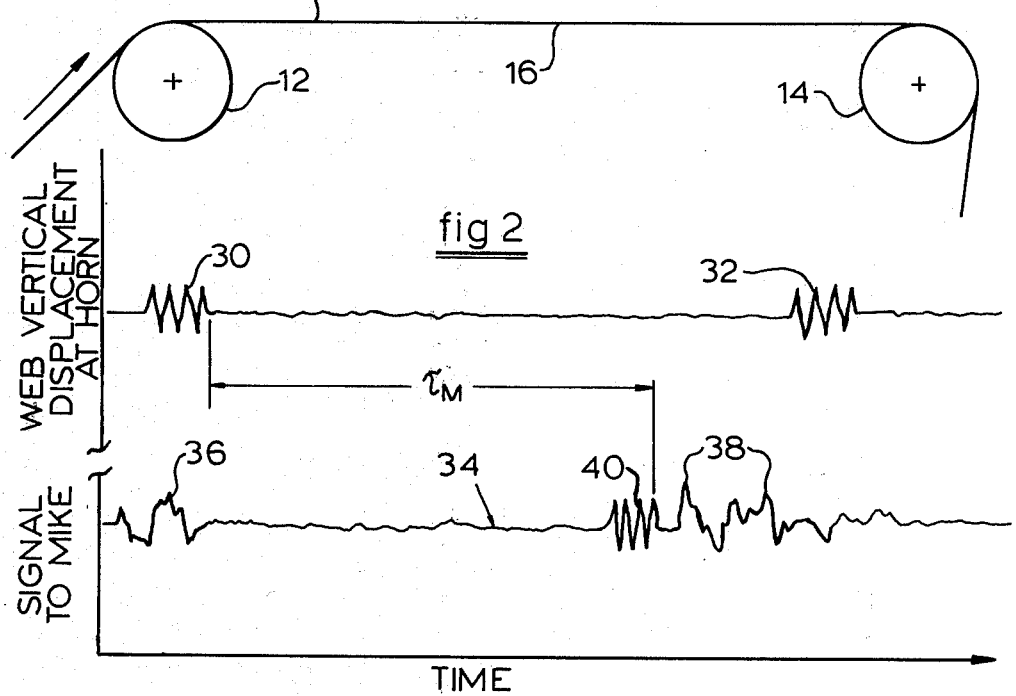
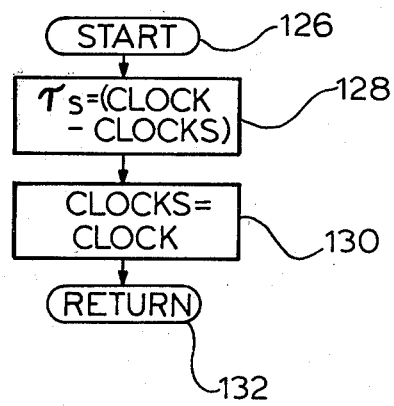

SONIC MEASUREMENT OF WEB TENSION

BACKGROUND OF THE INVENTION

1. Field of the Invention

The present invention relates to measuring web tension, and in particular for the sonic measurement of web tension in paper machines.

2. Description of Prior Art

As is well known to those skilled in the paper making art, and to those skilled in the handling of moving webs of paper, excessive tension can tear the web and inadequate tension can cause edge flutter at high machine speeds, which will eventually cause a break if the amplitude of the flutter becomes excessive. In both cases, down time results. Conventionally, unsupported web tension is controlled by slight differences in machine speed, and machine speed differential is manually controlled and must be changed as the web shrinks as it passes through different sections of the machine. Therefore, the control of tension through the control of machine speed has heretofore been a critical operation and must be frequently monitored.

An open draw is necessary because as the web loses water, it shrinks. Shrinkage in the machine direction is restrained somewhat by the changes of machine speeds. Therefore, the paper quality, for example, ultimate strength, stretchability, etc., will be affected by the web tension.

As reported by K. W. Britt, *Pulp and Paper Technology*, 2nd, E. Van Nostrant, 1970, p.468 "There is no known instance of a successful attempt being made to automatize any of the critical draws on a paper machine. For example, on an open draw machine, the speed difference between the machine wire and the first press felt has an important effect on both machine runability and the product of mechanical and/or functional properties. A technique for sensing the tension in such a draw and adjusting it to maintain web tension at a specified level would be quite beneficial. At present, no practical method for sensing said tension is available, but optical scanning methods and knowledge of paper rheology (as a function of moisture content) may offer a route to do a successful solution."

Transverse waves are created when a string, under tension, is disturbed, and transverse waves are created when the surface of water is disturbed. Likewise, when a membrane under tension is disturbed transverse waves are also generated. If the bending stiffness of the membrane can be neglected, these transverse waves have a wave velocity in accordance with the relationship $$a = \sqrt{Tg_c/w} \qquad (1)$$

where

T = tension in membrane (lb force/ft),
w = weight of membrane/unit area (lb mass/ft$^2$),
a = wave velocity (ft/sec),
$g_c$ = conversion factor (37.17 lb mass/lb force ft sec$^2$)

In U.S. Pat. No. 4,109,520, Leif Eriksson discloses a method for measuring web tension of a stationary web which applies a frequency near the resonance of a loudspeaker pressed against the web. The impedance of the loudspeaker at this frequency is a function of the web tension.

In U.S. Pat. No. 2,661,714, I. A. Greenwood, Jr. et al disclose a method of measuring web thickness of a traveling web with ultrasonic techniques in which the web must be pressed or held against an anvil-type support at the measuring location below an X-cut piezoelectric crystal which produces air compressional waves.

SUMMARY OF THE INVENTION

The object of the present invention is to provide a sonic measurement of web tension for a running web which is not supported in the area of measurement, with the exception of the conventional support given by the rolls which define the path of web travel. According to the invention, the above object is achieved by energizing a sonic transducer at a first location adjacent an open draw to create a burst of transverse waves in the travelling web. At a second location, downstream from the sonic transducer, a microphone is provided to receive the burst of transverse waves and to convert the same into electrical signals. The machine speed is also measured and fed as representative electrical signals to an electronics unit which measures the time of travel of the transverse wave and the moving web and subtracts the web speed to provide the velocity of the transverse wave. The velocity of the transverse wave is directly related to a web tension and is calculated and displayed in units of tension.

The electronic control circuit generates an electronic window during an interval during which the burst of transverse waves should be received so that noise and echoes may be discriminated. In addition, a control circuit provides for a minimum reception duration time threshold in order to make the system more immune to noise. Thus, the burst of waves must be detected for a certain length of time before a decision is made by the control system that a wave train is truly detected.

Several advantages are obtained by practicing the present invention. First of all, ultrasonic sound is employed to avoid signal interference problems in that there is a much lower frequency sound around a paper machine, and a sharper, more accurate measurement can be made with ultrasonic measurements. Secondly, a train of pulses of high frequency sound is employed so that the signal from the microphone can be processed with a moderate width band pass filter so that only frequencies close to the nominal ultrasonic transducer frequency will pass through the circuit. Since high frequency is absorbed (damped) more than low frequencies, an optimum range of frequencies exists and the selection of a particular frequency is dependent on the application. The calculation of tension requires the mass per square foot of the web, which depends on the solids content as well as the moisture content and in my preliminary investigations with the same has been assumed to provide a mass of 32 lb/3000 ft$^2$ for an open draw of newsprint.

High frequency sound is very directional and can be provided as a narrow beam. Therefore, the ultrasonic transducer may be located at a greater distance from the web than the microphone, and it is submitted that the microphone would best be located near a roll where the extraneous web excursions would be smaller, and hence the signal-to-noise ratio would be improved.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic illustration of an open draw, for example of newsprint, in which the rolls at each end of the draw are drawn at slightly different speeds to control web tension, and illustrating, in schematic form, a sonic web tension measurement of system;

FIG. 2 is a graphic illustration of the excursions of a web, in the form of transverse waves, due to an ultrasonic pulse train, for example, 20 kHz, and a wave form of the signals received by the microphone, including noise from the paper machine secondary waves, and echoes;

FIG. 7 is a computer flow chart illustrating the routine which is entered upon interrupt of the microprocessor by the roll speed transducer which provides machine speed signals.

DESCRIPTION OF THE PREFERRED EMBODIMENTS

Figure 3:
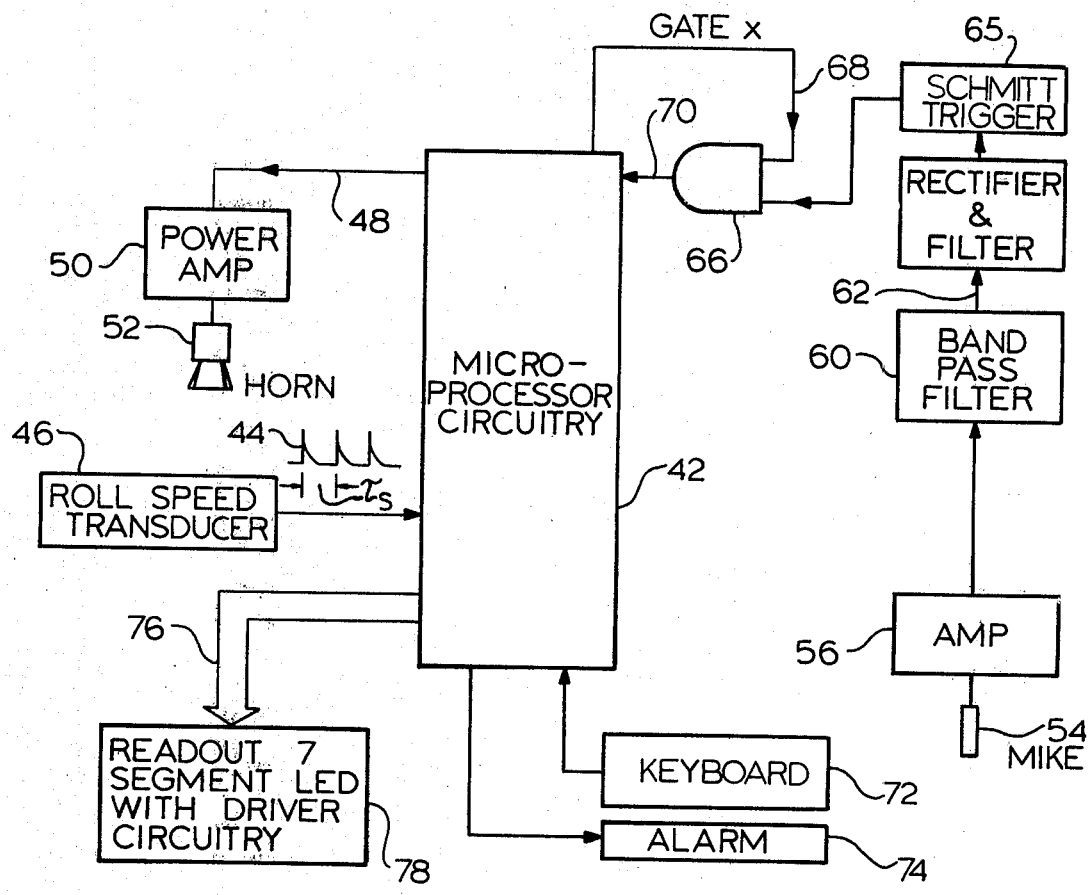
FIG. 3 is a schematic diagram of a web tension measurements system which may be employed in practicing the present invention.

Referring to FIGS. 1 and 2, and open draw of a paper machine is illustrated, generally at 10 as comprising a pair of rolls 12 and 14 carrying a moving web 16 in the direction indicated. The mill operator must adjust the speed of each of the rolls 12 and 14 so that the web tension remains within an acceptable range. The web is oscillated in a vertical direction by a train of pulses from an ultrasonic horn 18 to create a transverse wave which travels along the moving web 16 toward a microphone 22. The time interval between emission of the ultrasonic signal and the receipt of the wave at the microphone 22 is a combination of web velocity and wave velocity relative to the web; therefore, the web speed (machine speed) must be subtracted in order to provide the wave velocity relative to the web. For this purpose, a machine speed transducer 24 is connected to the roll 14 and produces a signal representing machine speed. The machine speed signal and the signal received by the microphone 22 are fed to a web tension electronics circuit 20 which calculates wave velocity from these two inputs and converts web velocity into an output signal which indicates web tension. This output signal is fed to a display 26 for observation by the mill operator.

FIG. 2 illustrates the vertical displacement of the web at 28 which includes two successive sets of displacements 30,32, and due to successive blasts of ultrasonic horn 18 and minor excursions therebetween due to extraneous disturbances from the paper machine. In the lower portion of FIG. 2, the signals received by the microphone 22 are illustrated at 34 as comprising a signal 40 which resulted from the blast causing the excursions 30 and composite echoes 36 and 38 from previous blasts, secondary waves, as well as the minor noise generated by the paper machine. Secondary waves originate at the horn and move along the moving web in a direction opposite to that of web travel. However, if the web is traveling faster than the transverse wave velocity, these waves move, with respect to fixed coordinates, in the direction of the web and will reach the microphone at a time later than the primary waves 40, and can be discriminated against on a time of travel basis.

Figure 4:
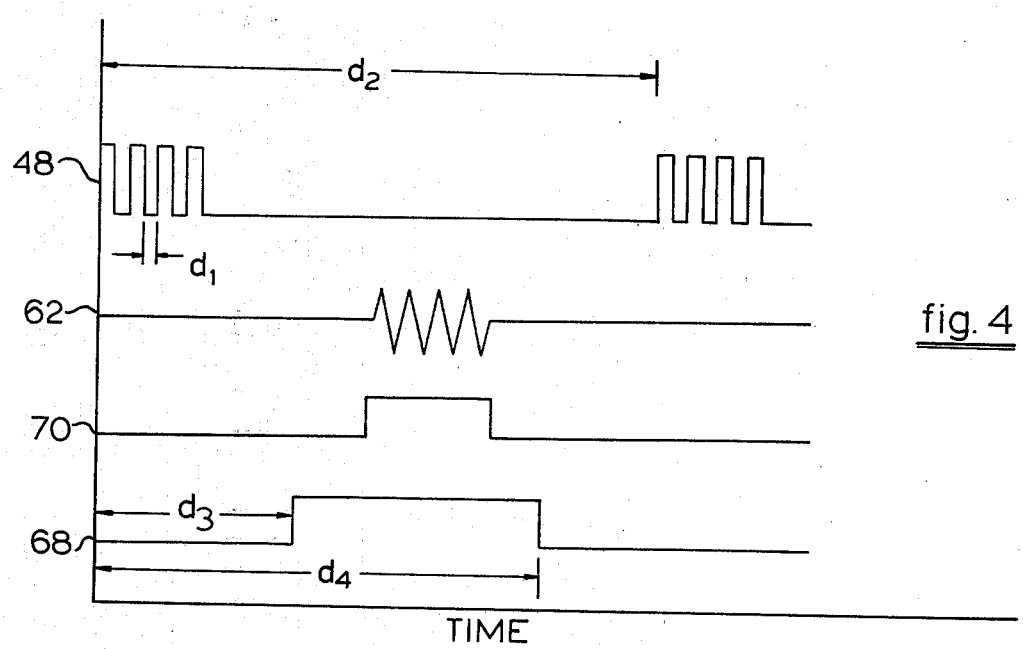
FIG. 4 is a graphic illustration of signals at various points in the circuit of FIG. 3.

Referring to FIGS. 3 and 4, a circuit and corresponding wave forms are illustrated for a web tension measurement system constructed in accordance with the present invention. Inasmuch as a microprocessor may readily be programmed for the simple functions necessary for practicing the present invention, the same is used herein at 42 and may contain, for example, an Intel 8080 or a Zilog Z80 microprocessor, as well as a memory, a power supply and signal conditioning circuits. The microprocessor 42 receives the machine's speed signal 44 from a roll speed transducer 46 which may simply be a magnetic pulser driven by a roll, producing one pulse for each revolution of the roll.

The microprocessor 42 is programmed to provide wave velocity in accordance with the equation.

$$a = [Y/(\tau_M - d_{min})] - (K/\tau_s) \quad (2)$$

where
$K = \pi(D+t)$ (ft),
$D$ = diameter of roll (ft),
$t$ = thickness of web (ft),
$a$ = wave speed (ft/sec),
$Y$ = distance between horn and mike (ft),
$\tau_m$ = time interval between beginning of wave transmitted and confirmed receipt, including $d_{min}$ (sec),
$d_{min}$ = minimum reception time (sec) for noise immunity, and
$\tau_s$ = time interval for one revolution of the roll (sec).

The microprocessor is also programmed to provide web tension by a calculation made in accordance with the equation $$T = a^2 w/g_c \quad (3)$$

which is, using the nomenclature above, the same as equation (1).

In order to provide these functions, the microprocessor 42 generates a square wave ultrasonic frequency 48 to a power amplifier 50 which energizes an ultrasonic horn 52 to excite the web into transverse oscillations. As seen in FIG. 4, the ultrasonic frequencies are generated with a half period of $d_1$ and is repeated at an interval $d_2$. The resulting transverse waves travel along the web, and with the web moving toward a microphone 54 where they are received, converted into electrical signals and amplified by an amplifier 56. The signals are fed to a band pass filter 60 to provide an output signal 62, as indicated in FIG. 4. The signal 62 is rectified and filtered. Signals of sufficient strength pass through the Schmitt trigger circuit 65, and are gated at 66 with a signal 68 provided by the microprocessor 42, to form a signal 70 which is fed back to the microprocessor 42.

The signal 68 is a gate signal which represents an electronic window which is open only slightly more than the expected duration of receipt of the transverse wave and is determined to open at a time $d_3$ from the beginning of emission and is to close at a time $d_4$, also referenced to the initial time of emission. Signals received at the microphone outside of the time interval $d_3$ to $d_4$ are rejected as being noise, composite echoes and the like.

In order to further increase noise immunity, the signal 70 must also be received for a minimum duration $d_{min}$.

The key board 72 is provided to input alarm set points and time intervals $d_1, d_2, d_3$ and $d_4$ as well as the parameter n which sets the length of time of the ultrasonic blast.

Figure 5:
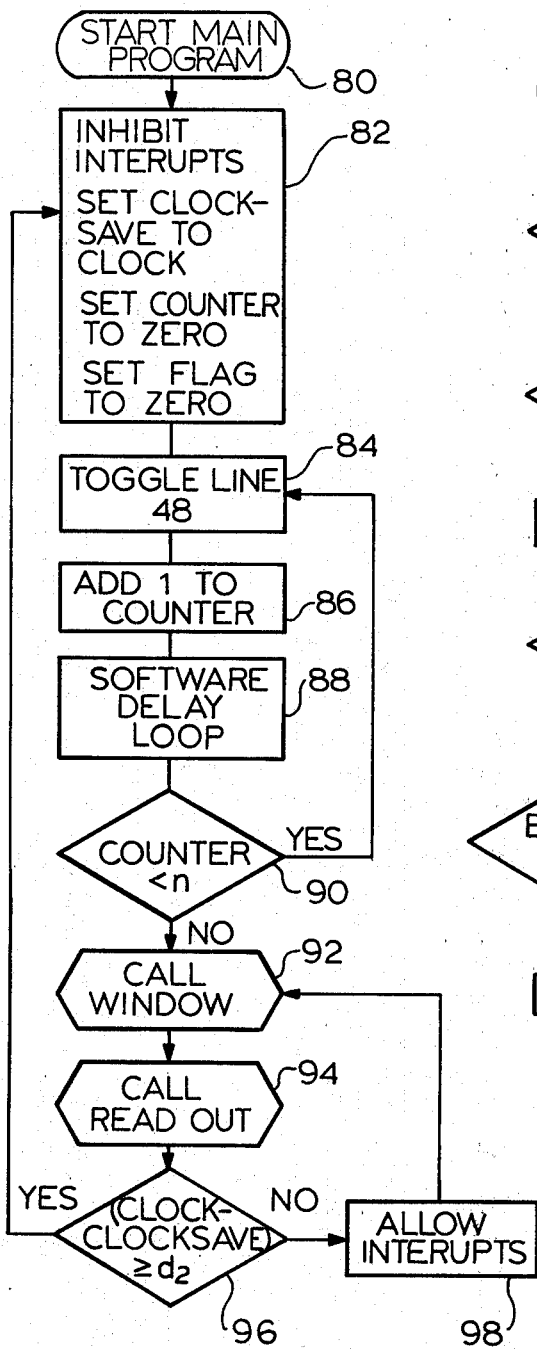
FIG. 5 is a partial computer flow chart of the main program for the system of FIG. 3.

Referring to FIG. 5, a flow chart illustrates the above process which starts at 80 and in the next step interrupts are inhibited, a counter is set to zero and a FLAG is set=0. A real time clock signal, called clock, is saved and stored in memory at a location CLOCKSAVE. Thus the parameters are initialized. The next step is to operate the output line 48 (FIG. 5) which is the line for controlling the power amplifier for so many cycles to form a blast of, for example ten cycles, at a frequency of, for example, 20 or 22 kHz. At each toggle, "1" is added to the counter, as indicated at 86 and a software delay loop 88 is provided before it is determined at 90 whether the counter is less than n where n=the total number of toggles desired. If the counter has not reached n, the output line 48 is again toggled. After achieving n counts a window routine is entered, as indicated at 92, and the web tension as calculated by the window routine is displayed by a routine READOUT at 94. Subsequently, the time interval from the start of a blast is determined and is compared to the interval $d_2$, and if the interval $d_2$ is less, the operation above is repeated. If the time $d_2$ has not been achieved, interrupts are allowed, as at 98, and the electronic window routine is again initiated.

Figure 6:
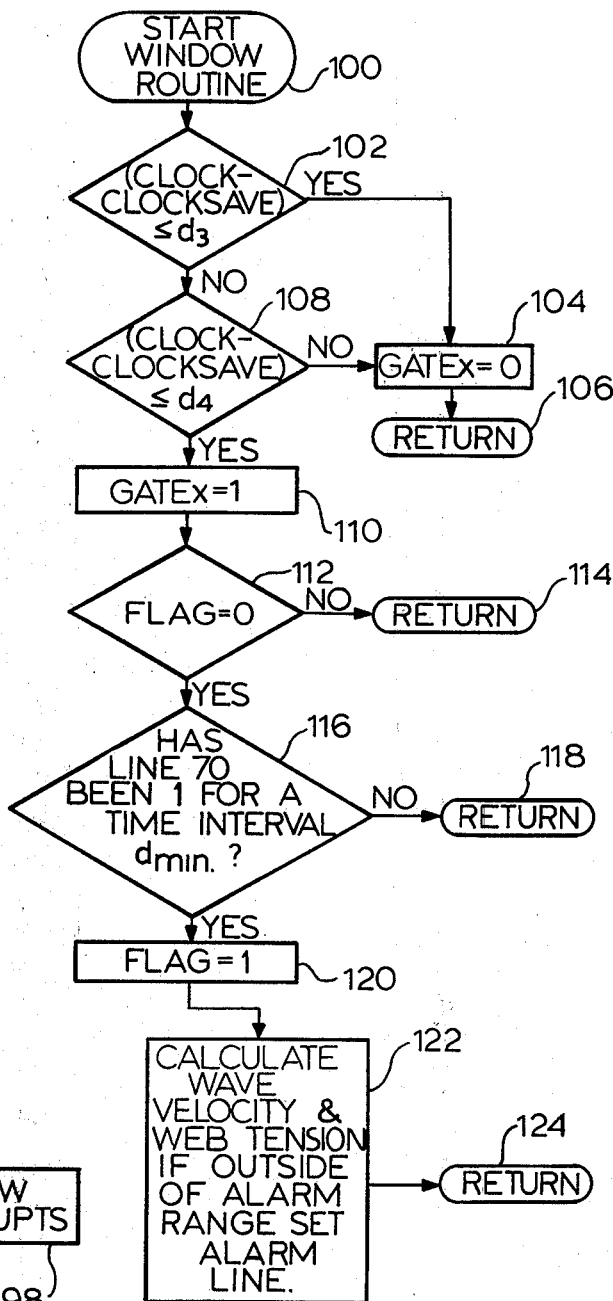
FIG. 6 is a computer flow chart illustrating the electronic window generation routine.

Referring to FIG. 6, the routine for the electronic window generation is illustrated with a START at 100 which initiates a CLOCK-CLOCKSAVE determination at 102 and 108. If this time is less than or equal to $d_3$ and is greater than $d_4$ then GATEX is set "0" and a return to the main program is executed at 106. Otherwise, the GATEX line is set to "1".

As long as line 68 remains at a "1", the signal from the microphone 54 may pass through the AND gate 66. A determination is then made as to whether a FLAG is equal to "1". If not a return is provided at 114. This test of FLAG allows only one calculation of web tension per blast. If FLAG="0", however, at 116, it is determined as to whether the line 70 has been "1" for a time interval $d_{min}$. If not, a return is provided at 118. If so, however, FLAG is set to "1", as in 120, and the wave velocity is calculated so that the tension may be calculated. At 122, it is also provided that an alarm setting is energized if the web tension falls outside of prescribed limits as set by the alarm set points. Afterward, there is a return to the main program where the web tension is displayed by a read out routine, as indicated at 94. At 96, if the time interval is greater than $d_2$, the main program is restarted.

The roll speed transducer is connected to an interrupt line. Upon an interrupt caused by the roll speed transducer, the routine of FIG. 7, is entered, if interrupts are allowed. This starts at 126 and the next step determines the timed interval for a revolution of the roll which is equal to (CLOCK-CLOCKSAVES). CLOCKS is then set equal to the value of the real time clock set 130, whereupon a return is provided at 132.

The readout flow sheet has not been included herein for the sake of simplicity. It basically involves the transfer of web tension stored in memory to a display unit (FIG. 3), e.g. a series seven segment light emitting diode units. If three significant digits are to be read, there would be 7+3=10 output lines, assuming the use of multiplexing for signal transfer.

For the case where wave travel velocity is faster than the web travel speed, the velocity of the wave traveling upstream can be measured by positioning the microphone upstream of the ultrasonic horn. The velocity of the wave relative to the web can be calculated by adding the web velocity to the wave velocity with respect to fixed coordinates.

Although I have described my invention by reference to particular illustrative embodiments thereof, many changes and modifications of the invention may become apparent to those skilled in the art, without departing from the spirit and scope of the invention. I therefore intend to include within the patent warranted hereon all such changes and modifications as may be reasonable and properly be included within the scope of my contribution to the art.

I claim:

1. A method of measuring web tension of a moving paper web, comprising the steps of:
    moving the paper web along a path and measuring the web speed;
    applying ultrasonic vibrations to the moving paper web at a first location along the path to produce transverse waves on the paper web, including generating an electrical signal at an ultrasonic frequency and applying the electrical signal to an ultrasonic transducer at the first location;
    sensing the interval between the application of the ultrasonic vibrations at the first location and the sensing of the transverse waves at the second location to determine the wave propagation velocity, including testing whether the reception time measured from the beginning of ultrasonic application falls within an interval between a minimum time and a maximum time, rejecting all measurements not within the time interval, algebraically adding the web travel time between the first and second locations as a velocity correction representing web tension.

2. The method of claim 1, wherein the step of sensing is further defined by the step of:
    filtering the output of the vibration/electrical transducer to eliminate substantially all electrical signals which are not due to the transverse waves.

3. The method of claim 2, wherein the step of timing if further defined by the steps of:
    gating the original electrical signal fed to the ultrasonic transducer to provide repetitive ultrasonic pulse trains;
    timing the interval of an ultrasonic pulse train of transverse waves from sending to receiving at the vibration/electric transducer and calculating the composite wave plus web velocity relative to fixed coordinates;
    digitizing the web speed and applying the same to correct the composite velocity relative to fixed coordinates to obtain wave velocity relative to the web; and calculating web tension from wave velocity relative to
the web in accordance with the equation $$T = a^2 w / g_c$$

wherein
    T=tension,
    a=wave velocity,
    w=mass per unit area, and
    $g_c$=lb mass ft/lb force sec$^2$ conversion factor.

4. The method of claim 1, comprising the further step of:
displaying a function of the time interval and web speed on a display unit calibrated in web tension units.

5. Apparatus for measuring web tension of a moving paper web, comprising the steps of:
means for moving the paper web along a path and means for measuring the web speed;
means for applying ultrasonic vibrations to the moving paper web at a first location along the path to produce transverse waves, including means for generating an electrical signal at an ultrasonic frequency, an ultrasonic transducer, and means for applying the electrical signal to said ultrasonic transducer at the first location;
means for sensing the transverse waves at a second location along the path; and
means for timing the interval between the application of the ultrasonic vibrations and the sensing of the transverse waves to determine the wave propagation speed relative to the web, including means for testing whether the reception time measured falls within a time interval between a minimum time and a maximum time, means for rejecting all measurements not within the time interval, means for algebraically adding the web velocity to obtain wave velocity and using the wave velocity relative to the web to calculate web tension.

6. The apparatus of claim 5, wherein said means for sensing is further defined as comprising:
filter means for filtering the output of said vibration-/electrical transducer to eliminate substantially all electrical signals which are not due to the transverse waves.

7. The apparatus of claim 6, wherein said means for timing is further defined as comprising:
means for gating the original electrical signal fed to the ultrasonic transducer to provide repetitive ultrasonic pulse trains;
means for digitizing the electrical signal provided and passing signals which are acceptable to the minimum-maximum-interval test and rejecting all other signals and using the processed digitized signal to stop the timing device;
means using the web velocity for converting the time interval to the velocity of the wave relative to a fixed position;
means for digitizing the web speed and algebraically adding the same to correct and obtain the wave velocity relative to fixed coordinates provided by the timing device to obtain wave velocity relative to the web; and
means for calculating web tension from web velocity in accordance with the equation $$T = a^2 w / g_c$$

where $T$ = tension,
$a$ = wave velocity,
$w$ = mass per unit area, and
$g_c$ = lb mass ft/lb force sec$^2$ conversion factor.

8. The apparatus of claim 5, and further comprising:
means for displaying a function of time interval and web speed, including means for transforming the same into units of web tension.

9. Apparatus for measuring web tension of a moving paper web, comprising:
first means for measuring the web speed and producing a representative first electrical signal, including a rotating roll supporting the paper web and a tachometer connected to said roll and producing said first electrical signal;
second means located adjacent a first web location and operable to energize the paper web with ultrasonic vibrations causing transverse waves along the moving paper web, including an electro/sonic transducer mounted adjacent the paper web;
third means located adjacent the paper web and spaced from said second means along the path of web travel for sensing the transverse waves, including a microphone located adjacent the paper web for picking up web vibrations; and
fourth means for measuring the time between energization of the paper web with ultrasonic vibrations and the sensing of the transverse waves and providing a second electrical signal, including a microprocessor having an oscillator connected to drive said second means, and connected to said third means and operable to compute the time interval of passage of the transverse wave on the paper web between said second and third means and constituting fifth means for calculating web speed with respect to a fixed position, sixth means for algebraically adding the web speed with respect to fixed coordinates to obtain wave speed relative to the paper web, and seventh means for converting wave speed into units of web tension.

10. A method of determining the tension in a traveling web, comprising the steps of:
subjecting the web to an ultrasonic blast at a first location to generate transverse waves in the web;
starting a timer at the initiation of the ultrasonic blast;
receiving the transverse waves at a second location and converting the same to electrical signals;
applying the electrical signals to stop operation of the timer;
calculating the wave plus web velocity relative to a fixed position from the elapsed time posted by the timer;
algebraically adding the web speed and the web plus wave velocity relative to fixed coordinates to obtain the wave velocity of the transverse waves relative to the web; and
converting the wave velocity into tension units and displaying the same.

* * * * *